(12) United States Patent
Boyett (10) Patent No.: US 12,280,708 B2
(45) Date of Patent: Apr. 22, 2025

(54) TIE-DOWN CHAIN ANCHOR AND STORAGE SYSTEMS

(71) Applicant: Roy M. Boyett, Dale, TX (US)

(72) Inventor: Roy M. Boyett, Dale, TX (US)

( * ) Notice: Subject to any disclaimer, the term of this patent is extended or adjusted under 35 U.S.C. 154(b) by 567 days.

(21) Appl. No.: 17/840,068

(22) Filed: Jun. 14, 2022

(65) Prior Publication Data
US 2023/0001843 A1   Jan. 5, 2023

Related U.S. Application Data

(60) Provisional application No. 63/217,647, filed on Jul. 1, 2021.

(51) Int. Cl.
| *B60P 7/08* | (2006.01) |
| *B60P 3/079* | (2006.01) |
| *B60P 3/40* | (2006.01) |
| *B60R 9/02* | (2006.01) |

(52) U.S. Cl.
CPC .............. *B60P 7/0807* (2013.01); *B60P 3/079* (2013.01); *B60P 3/40* (2013.01); *B60R 9/02* (2013.01)

(58) Field of Classification Search
CPC ..... B60P 7/0807; B60P 7/0846; B60P 7/0869; B60P 3/40; B60P 3/079; B60R 9/02
See application file for complete search history.

(56) References Cited

U.S. PATENT DOCUMENTS

| 3,740,073 | A | * | 6/1973 | Schwiebert | B60P 7/083 410/47 |
| 4,114,855 | A | | 9/1978 | Adamson, Jr. | |
| 5,217,208 | A | * | 6/1993 | Stephenson | F16G 11/12 242/379 |
| 7,523,920 | B2 | | 4/2009 | Semke | |
| 2004/0007701 | A1 | * | 1/2004 | Goulet | B60P 7/0846 254/213 |

* cited by examiner

*Primary Examiner* — Daniel J Colilla
(74) *Attorney, Agent, or Firm* — Johnston IP Law, PLLC (57) ABSTRACT

A tie-down chain anchor and storage system for use on trailers, such as flatbed trailers. The system includes a container for holding the chain when not in use a top opening that has anchor slots for securing the chain at a given distance when using the chain to secure equipment on the trailer. The container has a flat top, and the container is coupled to other aspects of the trailer with the flat top flush with a flat portion of the trailer. The system allows for storage of the securing line, e.g., chain, point of pull, and no impediment in loading the trailer. Other embodiments are presented.

20 Claims, 11 Drawing Sheets

TIE-DOWN CHAIN ANCHOR AND STORAGE SYSTEMS

CROSS-REFERENCE TO RELATED APPLICATION

This application claims the benefit of U.S. Provisional Patent Application 63/217,647, filed Jul. 1, 2021, entitled "Tie-Down Chain Anchor and Storage Systems," which is incorporated herein by reference for all purposes.

TECHNICAL FIELD

This application is directed, in general, to systems and methods for securing equipment on flatbed trailers, and more particularly to tie-down chain anchor and storage systems.

BACKGROUND

The following discussion of the background is intended to facilitate an understanding of the present disclosure only. It should be appreciated that the discussion is not an acknowledgement or admission that any of the material referred to was part of the common general knowledge at the priority date of the application.

For both private and commercial equipment trailers, chain, binder, and ratchet strap storage and securement are challenging. One must protect the chains, binder, and ratchet straps from theft and manage the location of the items along with securing the equipment to be hauled. Improvements are desired.

SUMMARY

According to an illustrative embodiment, a tie-down chain anchor and storage system for use in combination with a flatbed trailer includes a container having a flat top surface and an interior compartment and a top opening and a lid coupled to the container proximate the top opening for selectively covering the top opening. The lid is substantially flush with the flat top surface of the container. The system further includes a first chain slot formed on an inboard location on a periphery of the top opening and proximate to the lid. The first chain slot is sized and configured to secure a chain link when inserted and tension applied. The container is coupled to the flatbed trailer with the flat top surface of the closed container substantially flush with a top surface of the flatbed trailer.

According to an illustrative embodiment, a trailer for hauling equipment includes a flatbed portion for receiving the equipment and a plurality of tie-down anchor and storage systems coupled to the trailer. The trailer has a periphery. Each member of the plurality of tie-down anchor and storage systems includes a container having a top surface with a top opening on a top member and a lid to selectively cover the top opening and a plurality of slots formed on the top member proximate the top opening, each of the plurality of slots for receiving a securing line. The container has an interior compartment for receiving and holding unused securing lines. Each of the plurality of tie-down anchor and storage systems has the top surface of the container flush with a top surface of the trailer. Other embodiments are disclosed further below.

DESCRIPTION OF THE DRAWINGS

Illustrative embodiments of the present invention are described in detail below with reference to the attached drawing figures, which are incorporated by reference herein and wherein.

DETAILED DESCRIPTION

In the following detailed description of the preferred embodiments, reference is made to the accompanying drawings that form a part hereof, and in which is shown, by way of illustration, specific embodiments in which the invention may be practiced. These embodiments are described in sufficient detail to enable those skilled in the art to practice the invention, and it is understood that other embodiments may be utilized, and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the claims. Unless otherwise indicated, as used throughout this document, "or" does not require mutual exclusivity.

This disclosure generally involves chain use and storage issues on flatbed and other trailers and the dragging of chains from other vehicles. The systems presented herein protect chains from theft and loss while keeping them conveniently located on the trailer at all times. Some possible advantages are mentioned below.

The disclosed systems provide for storage, point-of-pull securement, and ease of deployment of chains used in securing equipment onto trailers. Rather than the typical front of trailer box storage of chains, the systems create secure storage of each chain at flush level with the trailer to allow for storage, point of pull, and no impediment in trailer use. The flush surface tie-down chain anchors and storage units maybe designed of heavy steel that may be driven over by equipment. The below deck storage portion of some embodiments secures chains in place while allowing ease of deployment through a hinged lid. The point of pull slotted top allows securing loads with only the amount of chain needed at any given time while the remaining chain remains securely stored below deck.

Embodiments of the disclosed systems create strong holding, securement and point of pull notching for chains on a flatbed trailer. By having chain boxes secured beneath the deck of the trailer in strategic placement, chains always remain onboard the trailer and are no longer lost or stolen. Further, the flush lid allows for movement of equipment on and off the trailer with no obstruction. The point of pull top allows the operator to withdraw only the amount of chain needed and the rest to remain securely stowed below the deck of the trailer. While "chain" is used throughout, one should understand that a cable, strap, ratchet, or other securing line may be used in an analogous fashion.

Figure 1:
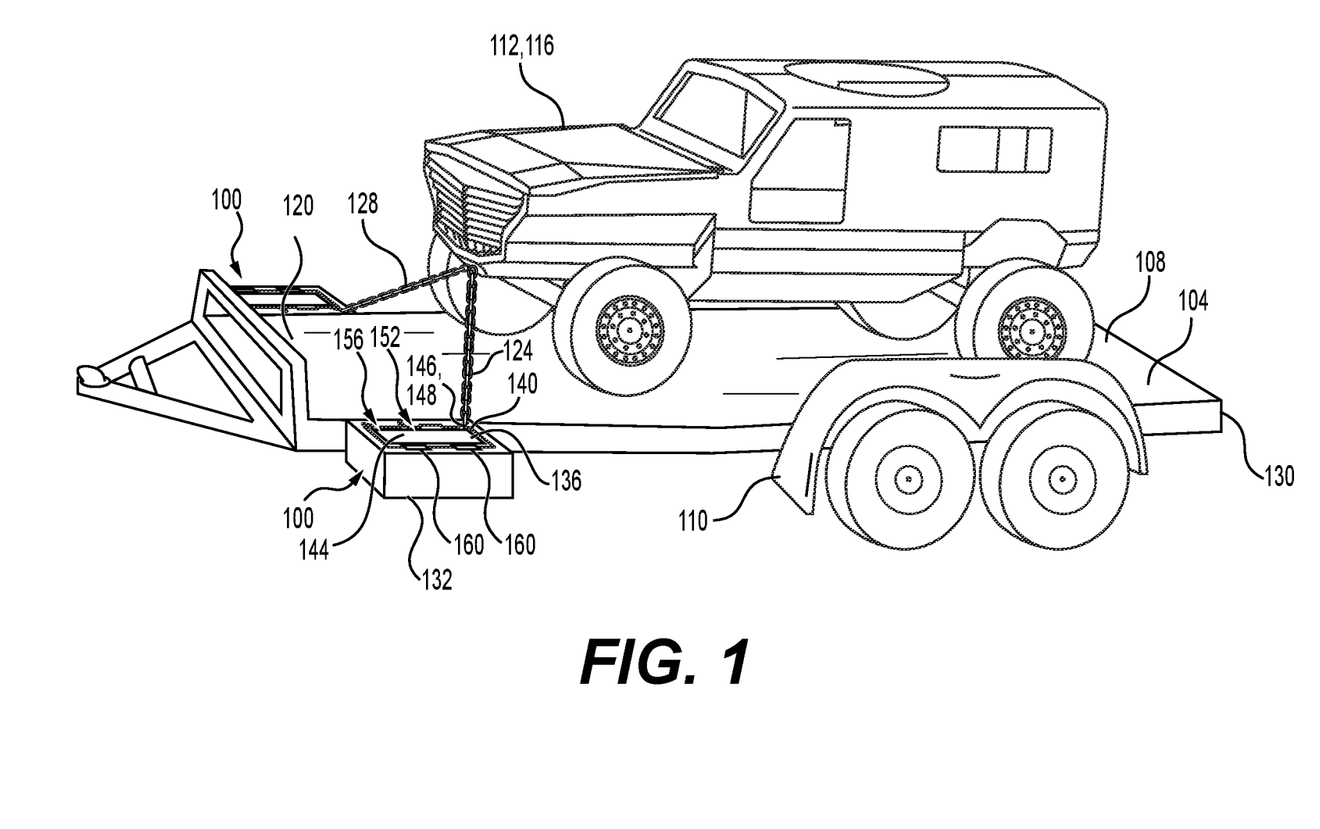
FIG. 1 is a schematic, perspective view of a flatbed trailer having an illustrative embodiment of a tie-down chain anchor and storage system.

Referring now to the figures and initially to FIG. 1, an illustrative embodiment of a tie-down chain anchor and storage system 100 for a flatbed trailer 104 is presented. The flatbed trailer 104 includes a flat top surface 108 on which equipment 112, such as the vehicle 116, may be positioned for transport. The equipment 112 often needs to be secured to the flatbed trailer 104 using chains. In this example, there are two tie-down chain anchor and storage systems 100 coupled to the front end 120 of the flatbed trailer 104 on the right and on the left. There may be four (see FIG. 7) or other numbers in some embodiments. Note that while flatbed trailers are referenced herein, it should be understood that other types of flat surfaces requiring chain securement may be the subject in other embodiments.

The left (perspective of driver's position) tie-down chain anchor and storage system 100 has a first chain 124 releasably secured thereto. The first chain 124 is also secured to the equipment 112 at the other end of the chain 124. Likewise, the right tie-down chain anchor and storage system 100 has a second chain 128 that is releasably secured to the tie-down chain anchor and storage system 100 at one end and to the equipment 112 at the other end of the second chain 128. Additional tie-down chain anchor and storage system 100 may be included on the flatbed trailer 104 such as at the rear 130 of the flatbed trailer 104 (again see FIG. 7) or at midsection or other locations. Unused chain, e.g., of chain 124, is stored in a container 132 in a below deck configuration. Below deck references being completely or substantially below the flat surface 108 of the trailer 104.

The tie-down chain anchor and storage system 100 has the container 132 having a flat top surface 136 and an interior compartment (196 in FIG. 2) and a top opening 140, which is covered by a lid 144. Typically, the flat top surface 136 is substantially (i.e., within a half inch) flush with the flat top surface 108 of the flatbed trailer 104. This allows the equipment 112 or other items to move over both surfaces 108, 136 without hinderance or issue.

Figure 2:
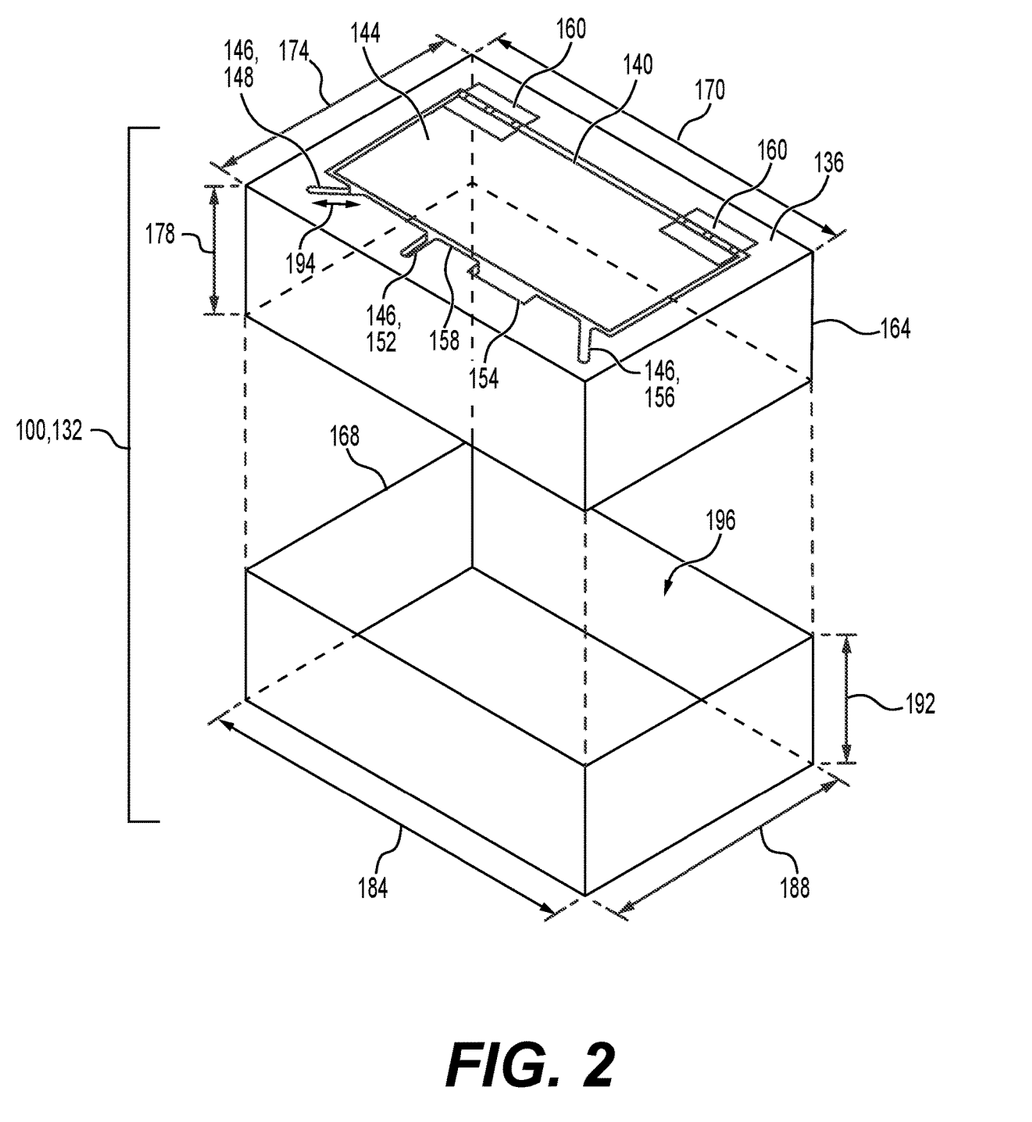
FIG. 2 is a schematic, partially exploded, perspective view of the illustrative embodiment of a tie-down chain anchor and storage system of FIG. 1.

Referring primarily to FIGS. 1 and 2, the lid 144 or a portion of the flat top surface 136 is formed with one or more chain slots 146 (or point of pull slots), e.g., a first chain slot 148, a second chain slot 152, and a third chain slot 156. The first chain slot 148 (and others if included) is formed on the top surface 136 at an inboard location on a periphery 158 of the top opening 140 and proximate to the lid 144. In some embodiments, the first chain slot 148 is angled towards the rear 130 of the trailer. The first chain slot 148 of the left tie-down chain anchor and storage system 100 is sized and configured to secure a chain link of the first chain 124 when inserted and tension applied. Some embodiments may include the second chain slot 152, which is substantially orthogonal to an edge of the top opening 140 of the container 132. In some embodiments, the lid 144 may be coupled to the container 132 by one or more hinges 160 or releasable fasteners or other means.

The container 132 may take different shapes, but in the illustrative embodiment of FIG. 1 is shown as having a rectangular plan view. Other shapes, e.g., circular, could be used in some embodiments. The container 132 may be coupled to the flatbed trailer 104 by welding or fasteners, e.g., screws, bolts, latches, etc. The container 132 holds chains waiting for use and any unused chain where they can be easily retrieved. As referenced in FIG. 6, the chain may be locked in place.

Referring now primarily to FIG. 2, the illustrative embodiment of the tie-down chain anchor and storage system 100 is shown in an exploded perspective view. In this illustrative embodiment, the tie-down chain anchor and storage system 100 is formed with an upper portion 164 and a lower portion 168. The upper portion 164 and lower portion 168 may be mated and coupled by welding or fasteners, e.g., bolts, screws, latches, etc. In one illustrative embodiment, the upper portion 164 has a longitudinal length 170 of 20 inches and a lateral width 174 of 8 inches and a depth 178 of 3.5 inches. In the same illustrative embodiment, the lower portion 168 has a longitudinal length 184 of 19.75 and a lateral width 188 of 7.75, and a depth 192 of 5, 7, or 9 inches. The first chain slot 148 has a length 194 of 2 inches. Those skilled in the art will understand that the dimensions may be varied for different applications and trailer sizes and other examples will be given further below. The mated upper or top portion 164 and bottom or lower portion 168 together form the container 132 with an interior compartment 196. The interior compartment 196 can store the first chain 124 (FIGS. 1 and 3-5) or other chains when waiting to be used or the portions not being used.

While FIG. 2 presents a container 132 formed with an upper portion 164 and a lower portion 168, it should be understood that in some embodiments, the container may be formed as a welded box without the upper and lower portions or constituent parts. Moreover, other shapes may be used.

While chains, e.g., chains 124, 128, are mentioned in the various embodiments, it should be understood that in some embodiments binder or ratchet straps may be stored and used in the system 100. In that case, a strap slot 154 is used that allows the strap to come out of the container 132 for application. The strap may be secured in the container and tightened between the equipment and the system 100.

Figure 3:
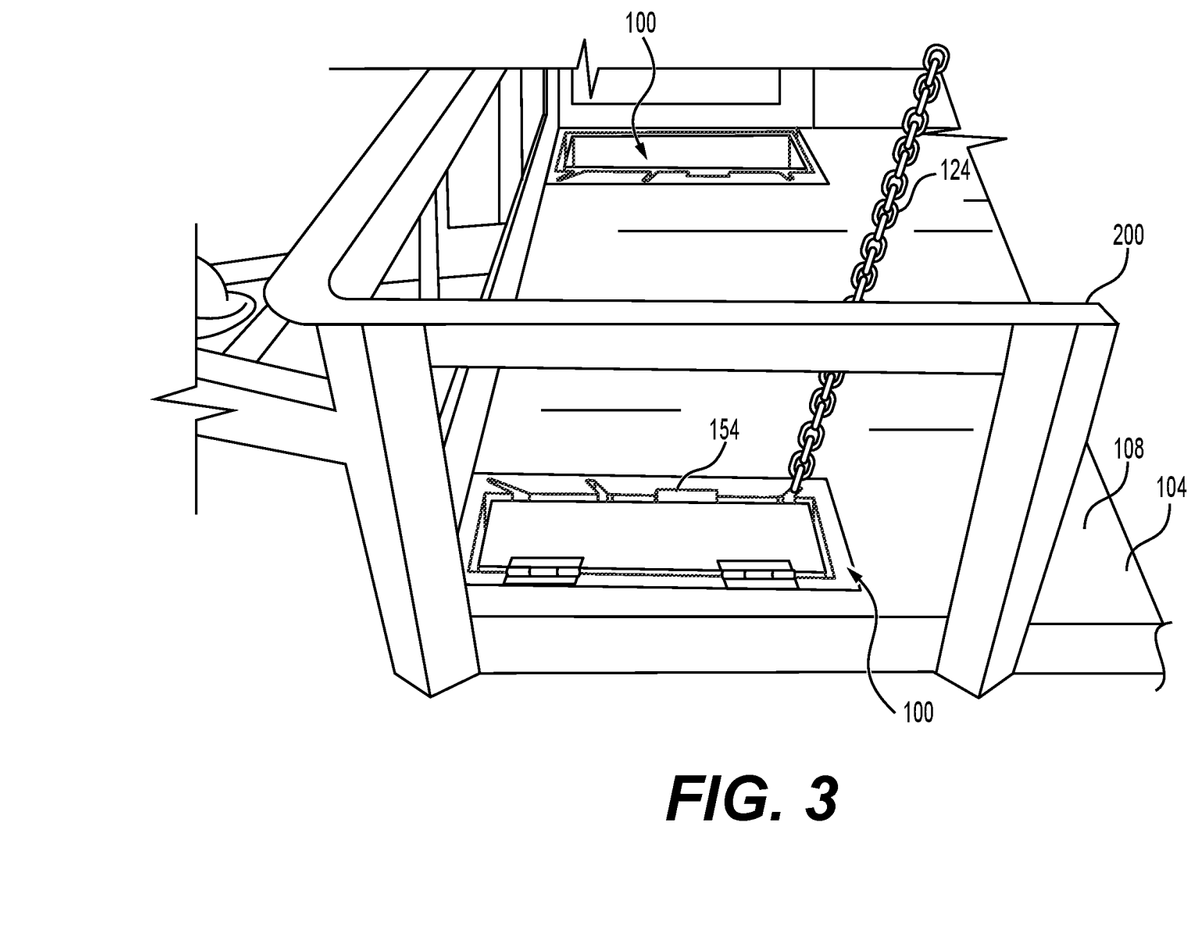
FIG. 3 is a schematic, perspective view of a portion of a flatbed trailer having another illustrative embodiment of a tie-down chain anchor and storage system.
Figure 4:
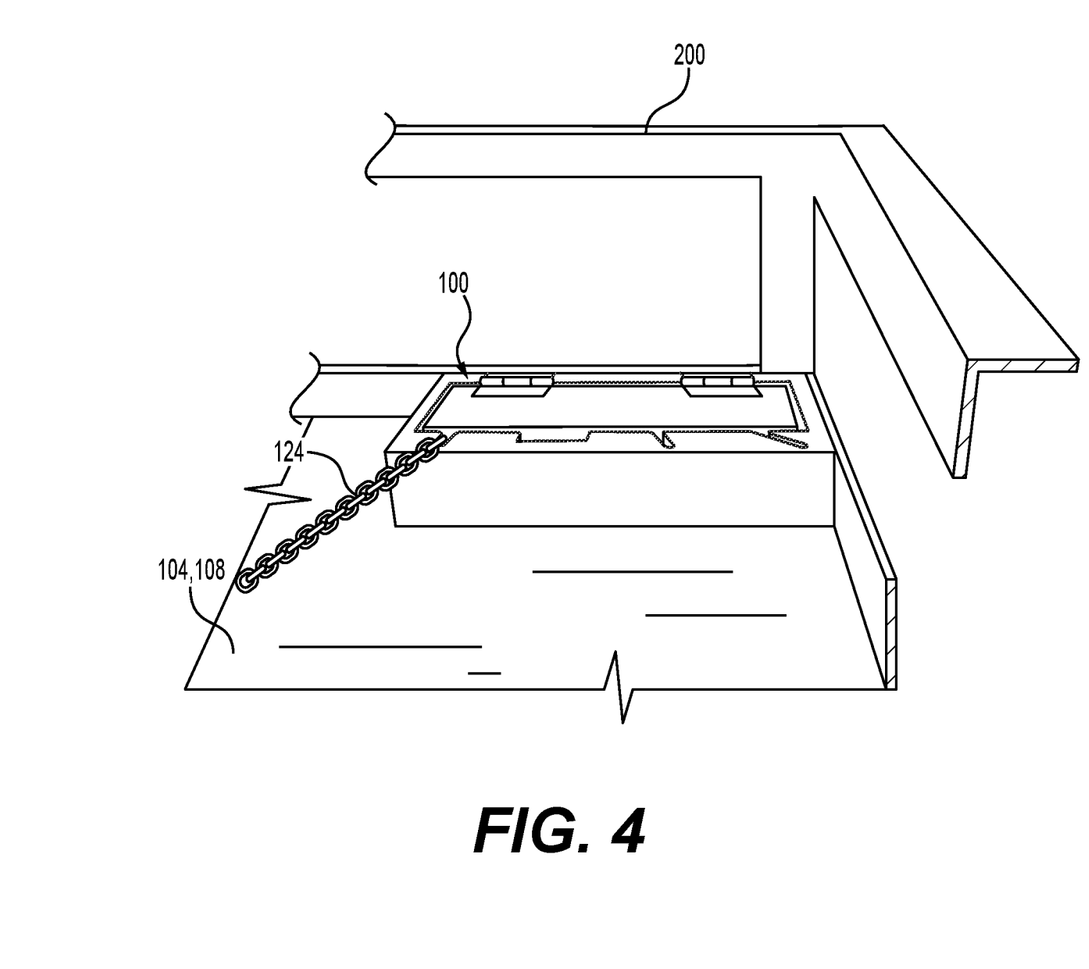
FIG. 4 is a schematic, perspective view of a portion of a flatbed and the illustrative embodiment of a tie-down chain anchor and storage system of FIG. 3.
Figure 5:
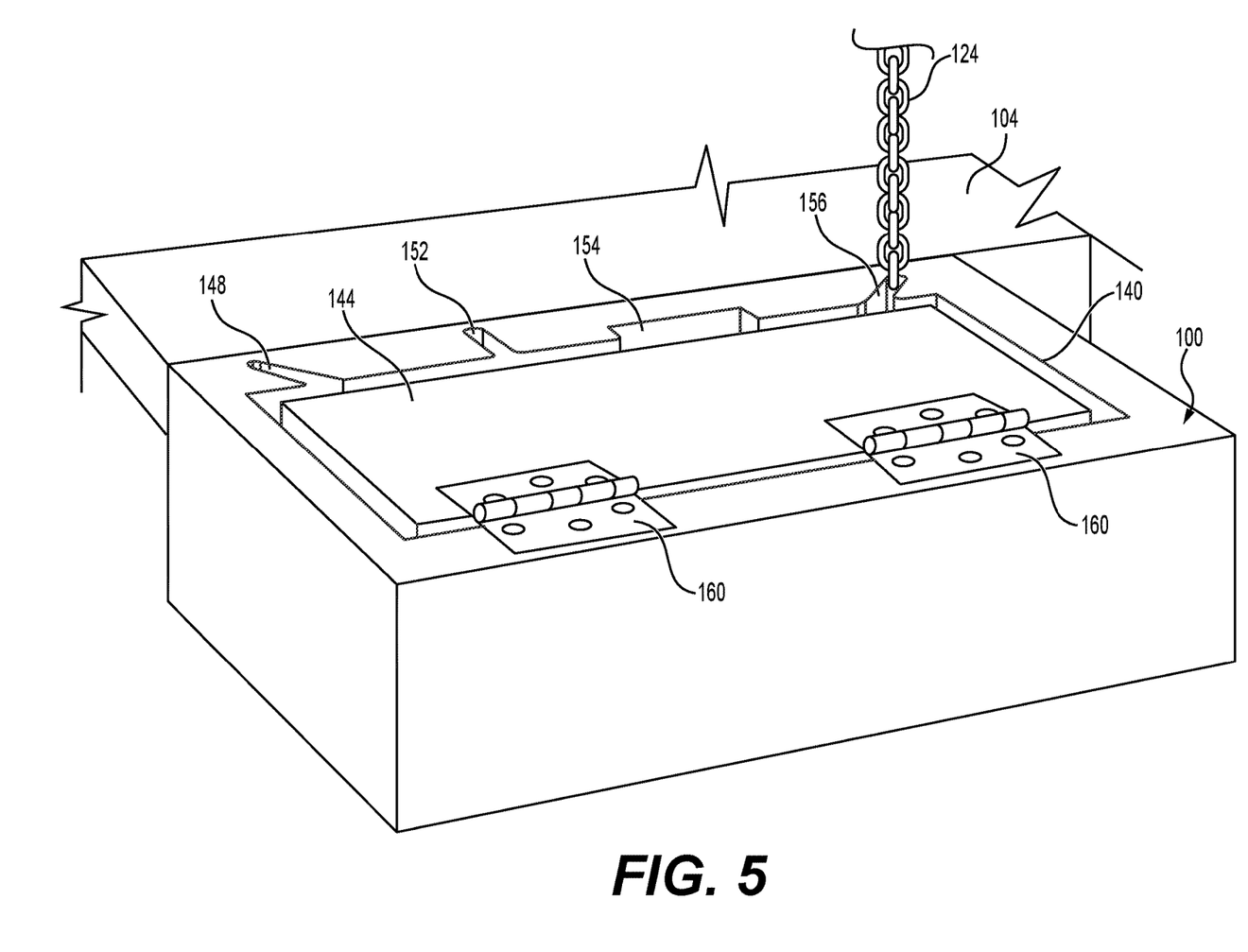
FIG. 5 is a schematic, perspective view of the illustrative embodiment of a tie-down chain anchor and storage system of FIGS. 3 and 4.

Referring now primarily to FIGS. 3-5, another illustrative embodiment of a tie-down chain anchor and storage system 100 is presented with a portion of a flatbed trailer 104 being shown. This embodiment is analogous to those previously presented but shows the tie-down chain anchor and storage system 100 inside a rail 200 or inboard an outer periphery of the trailer 104 and again substantially flush with the flat surface 108 of the trailer 104.

Figure 6:
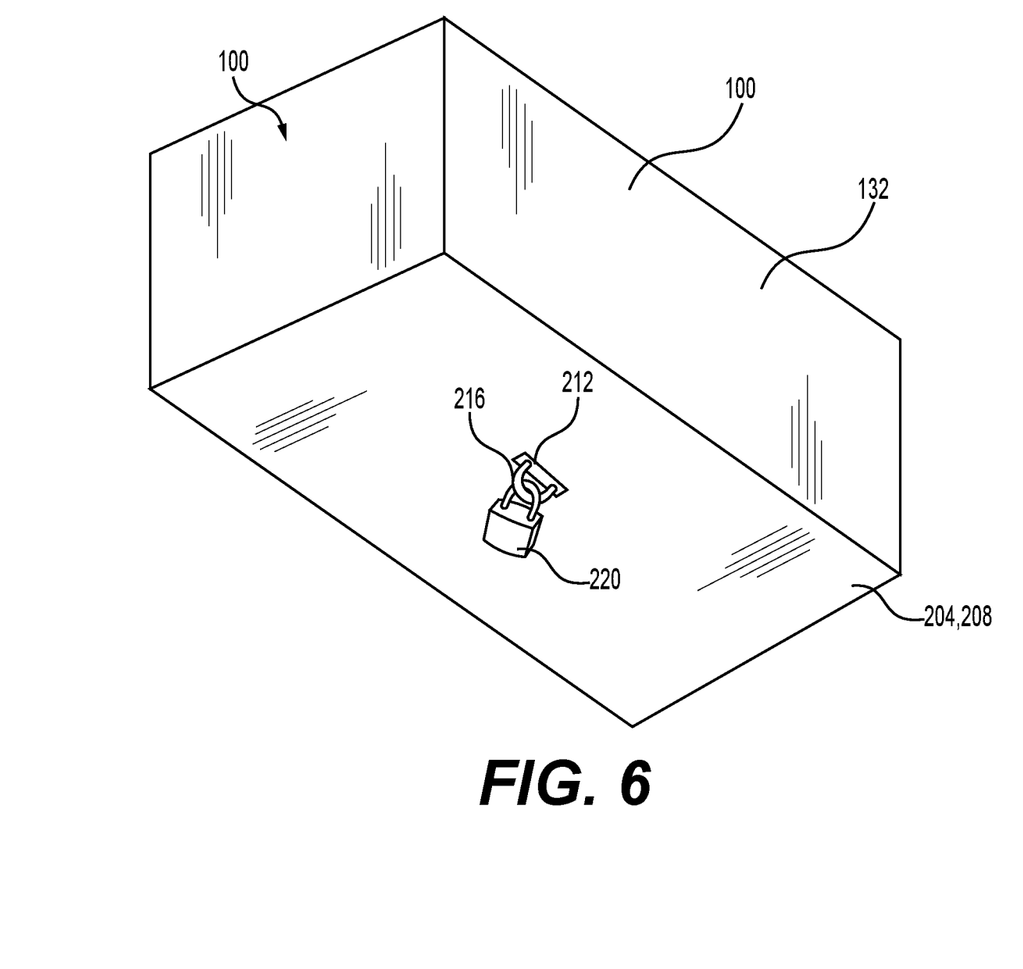
FIG. 6 is a schematic, bottom perspective view of an illustrative embodiment of a tie-down chain anchor and storage system.

Referring now primarily to FIG. 6, a schematic, bottom perspective view of an illustrative embodiment of a tie-down chain anchor and storage system 100 is presented. In this view, a bottom surface 204 of a floor 208 of the container 132 is shown. Some embodiments, like the one shown, have an opening 212 in the bottom floor 208 for extending a portion or link 216 of the chain, e.g., first chain 124, therethrough for locking with a lock 220 or other securing latch. In another embodiment, a loop is formed on an interior surface of the bottom floor 208 for locking the chain.

Figure 7:
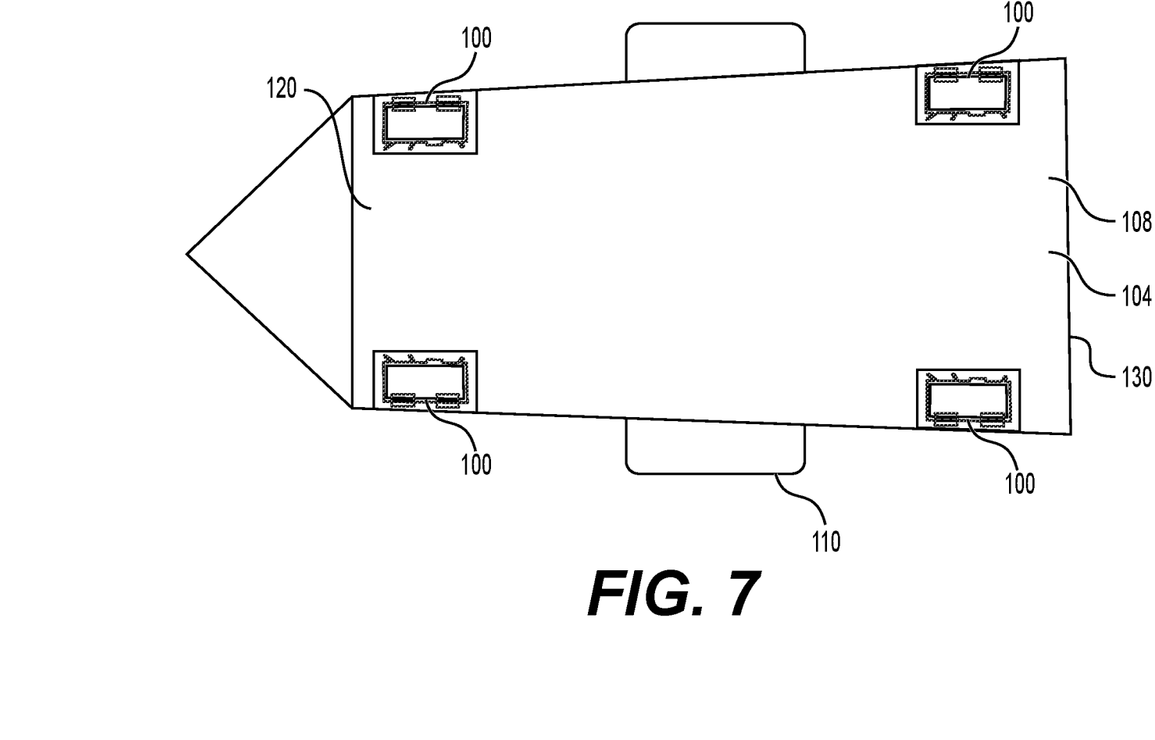
FIG. 7 a schematic, plan view of an illustrative embodiment of a flatbed trailer with four tie-down chain anchor and storage systems.

Referring now primarily to FIG. 7, an illustrative embodiment of a flatbed trailer 104 is shown having a flat surface 108 for receiving equipment. The trailer 104 has a plurality of wheels covered by wheel wells 110 (see also FIG. 1). This embodiment has four tie-down chain anchor and storage systems 100. Other tie-down chain anchor and storage systems 100 may be included or fewer tie-down chain anchor and storage system 100 may be used.

Figure 8:
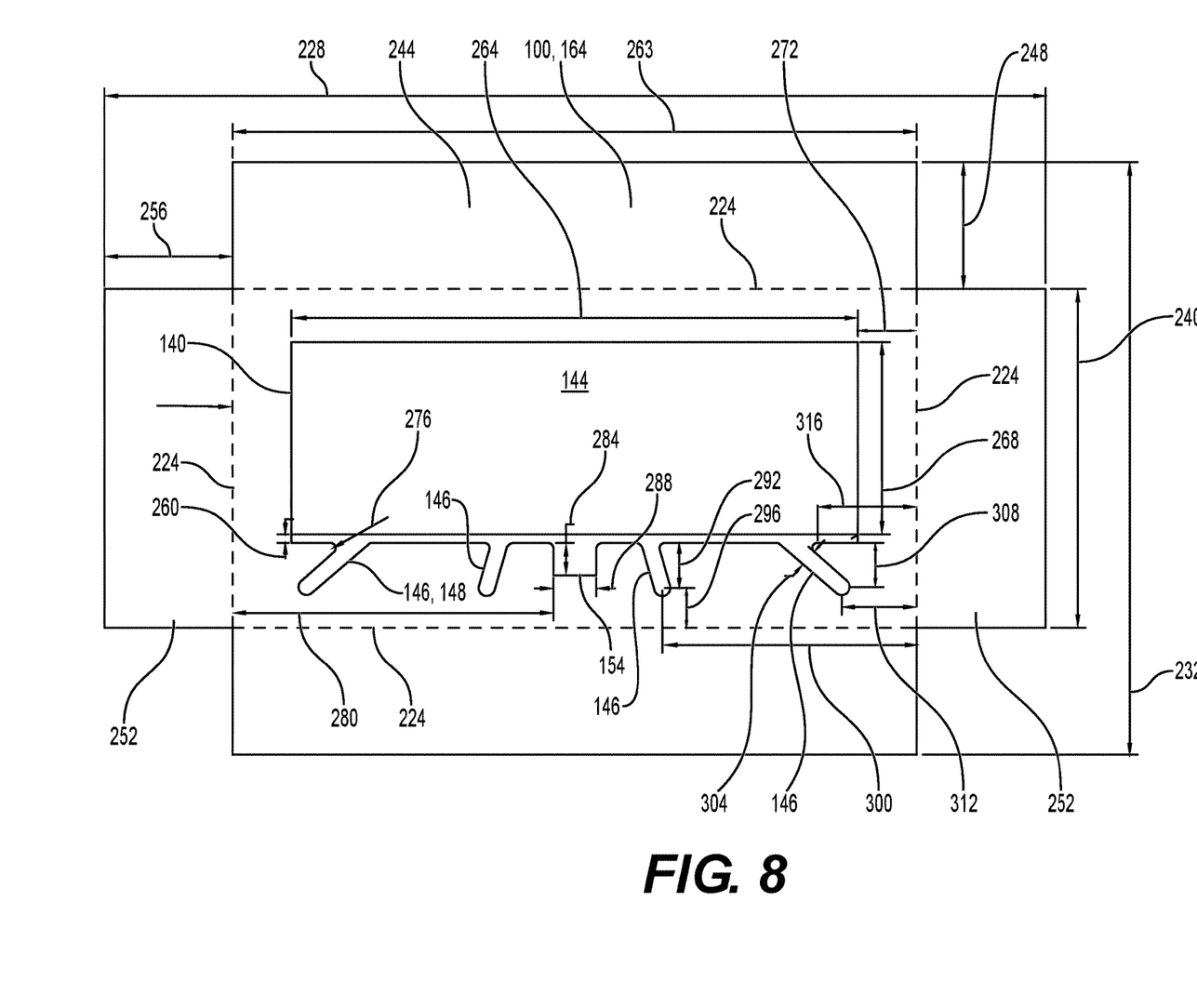
FIG. 8 is a schematic, top plan view of an illustrative embodiment of a tie-down chain anchor and storage system.

Referring now primarily to FIG. 8, a portion of another illustrative embodiment of a tie-down chain anchor and storage system 100 (FIG. 1) is presented. The figure shows an upper portion 164 when formed from steel plate or other material before being bent along bend lines 224, which are bent 90 degrees during manufacturing of the completed system 100. After bending, the upper portion 164 looks like the upper portion in FIG. 2. Dimensions and details for one illustrative embodiment will be given. Again, those skilled in the art will appreciate that other dimensions may be used.

The upper portion 164 has a pre-bend longitudinal dimension 228 of 22 inches and a pre-bend lateral dimension 232 of 14 inches. The post-bend longitudinal dimension or longitudinal dimension 236 of the completed upper portion 164 is 16.0 inches. The post-bend lateral dimension or lateral dimension 240 of the upper portion 164 is 8.0 inches. A flap forming a longitudinal side wall 244 has a dimension 248 of 3.0 inches. Likewise, a flap forming a lateral side wall 252 has a dimension 256 of 3.0 inches. The top opening 140 is cut and the lid 144 formed as shown with a 0.20 gap 260 formed. The top opening 140 has a longitudinal dimension 264 of 13.25 and a lateral dimension 268 of 4.54 inches. The dimension 272 from the top opening 140 to the bend line 224 on one end is 1.380 inches.

The one or more chain slots 146 (or point of pull slots) may be formed at various angles as suggested. The first chain slot 148 may be formed with leading radius 276 of 0.125 inches. The strap slot 154 may have a leading edge displaced by a dimension 280 from a bend line 224 and a depth 284 of 0.750 inches and length 288 of 1.00 inches. The third (from left for orientation shown) chain slot 146 may the following dimensions associated with it: dimension 292 of 1.06 inches, dimension 296 of 0.940 inches, and dimension 300 from the right bend line 224 of 5.950 inches. The fourth (from left for orientation shown) chain slot 146 has the following dimensions associated with it: dimension 304 of 0.380 inches; dimension 308 of 1.035 inches; dimension 312 of 1.760 inches; and dimension 316 of 2.30 inches. The lower portion of the container may be made from 20-gauge steel and the upper portion is 3/16 steel.

Figure 9:
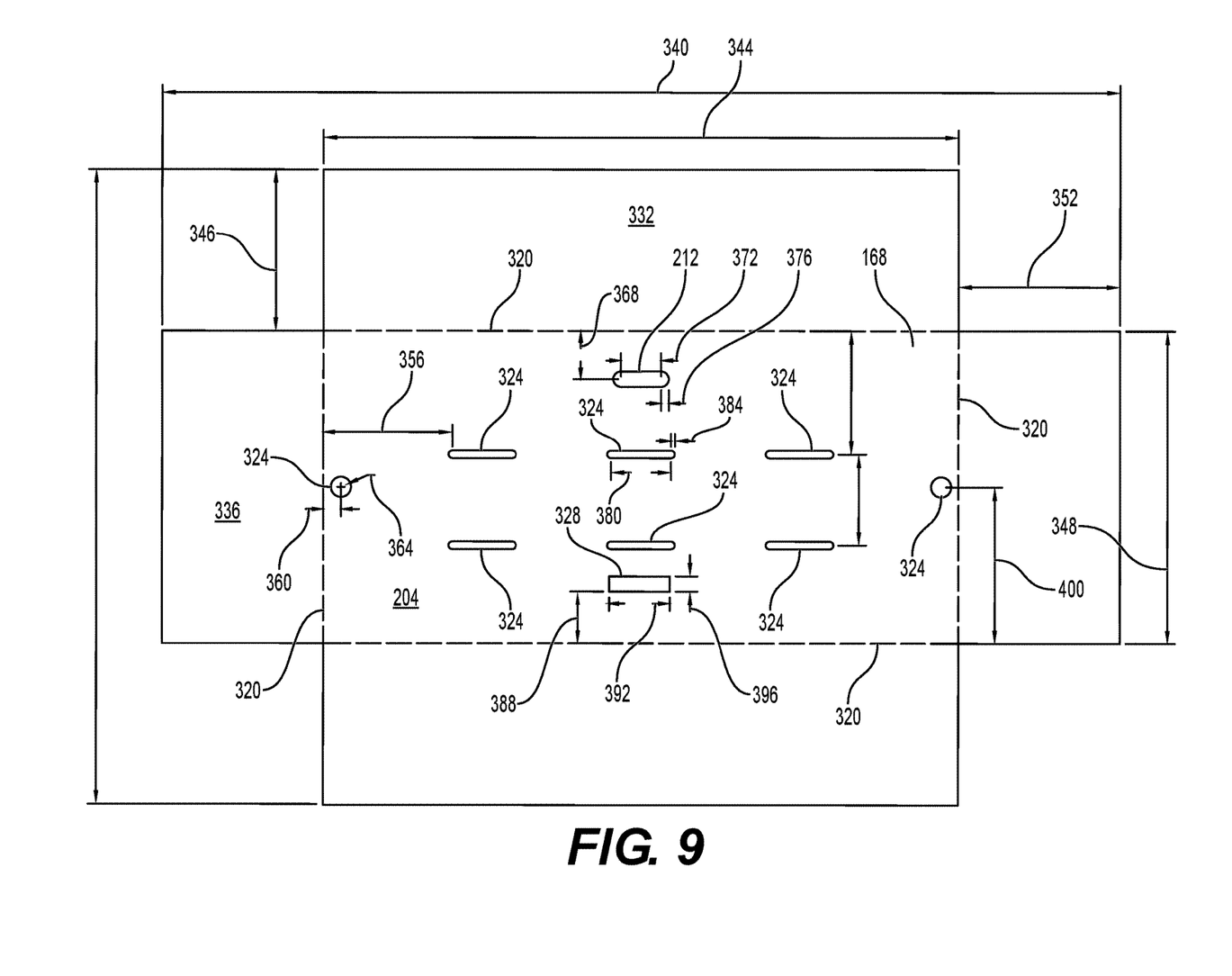
FIG. 9 is a schematic, bottom plan view of an illustrative embodiment of a tie-down chain anchor and storage system.

Referring now primarily to FIG. 9, a portion of another illustrative embodiment of a tie-down chain anchor and storage system 100 (FIG. 1) is presented. The figure shows a lower portion 168 when formed from steel plate or other material before being bent along bend lines 320, which are bent 90 degrees during manufacturing of the completed system 100. In general terms, the upper portion 164 (e.g., FIG. 8) and the lower portion 168 are sized and configured to mate with one another to form the container 132 (e.g., FIG. 1). A plurality of apertures may be formed on the bottom surface 204, such as the aperture or opening 212 for receiving the last link of a chain that is locked (see FIG. 6) on the exterior of the container; a plurality of drain apertures 324; and a top-lock aperture 328. With respect to the top-lock aperture 328, a rod having a slot at one end for receiving a shackle of a lock and at the other end having a "T" or a platform that can hold down the lid 144 when in position may be used to lock the lid 144 closed when not in use and chain is being stored. The lower portion 168 is assembled or formed into shape by bending longitudinal flaps 332 along their bend lines 320 and bending lateral flaps 336 along their bend lines 320. The pre-bend longitudinal dimension 340 is 23.75 inches in this embodiment which has been sized to mate with the upper portion of FIG. 8. The longitudinal flaps 332 have a longitudinal length 344 of 15.75 inches and a lateral dimension 346 of 4.0 inches. The lateral flaps have a dimension 348 of 7.75 inches and a dimension 352 of 4.0 inches. Other dimensions shown for this embodiment are as follows: dimension 356 of 3.190 inches; dimension 360 of 0.44 inches; dimension 0.5 inches diameter; dimension 368 of 1.190 inches; dimension 372 of 1.0 inches; dimension 376 of 0.19 inches; dimension 380 of 1.485 inches; dimension 384 of 0.10 inches; dimension 388 of 1.295 inches; dimension 392 of 1.5 inches; dimension 396 of 0.375 inches; and dimension 400 of 3.875 inches. Again, those skilled in the art will appreciate that different dimensions may be used in different situations.

Figure 10:
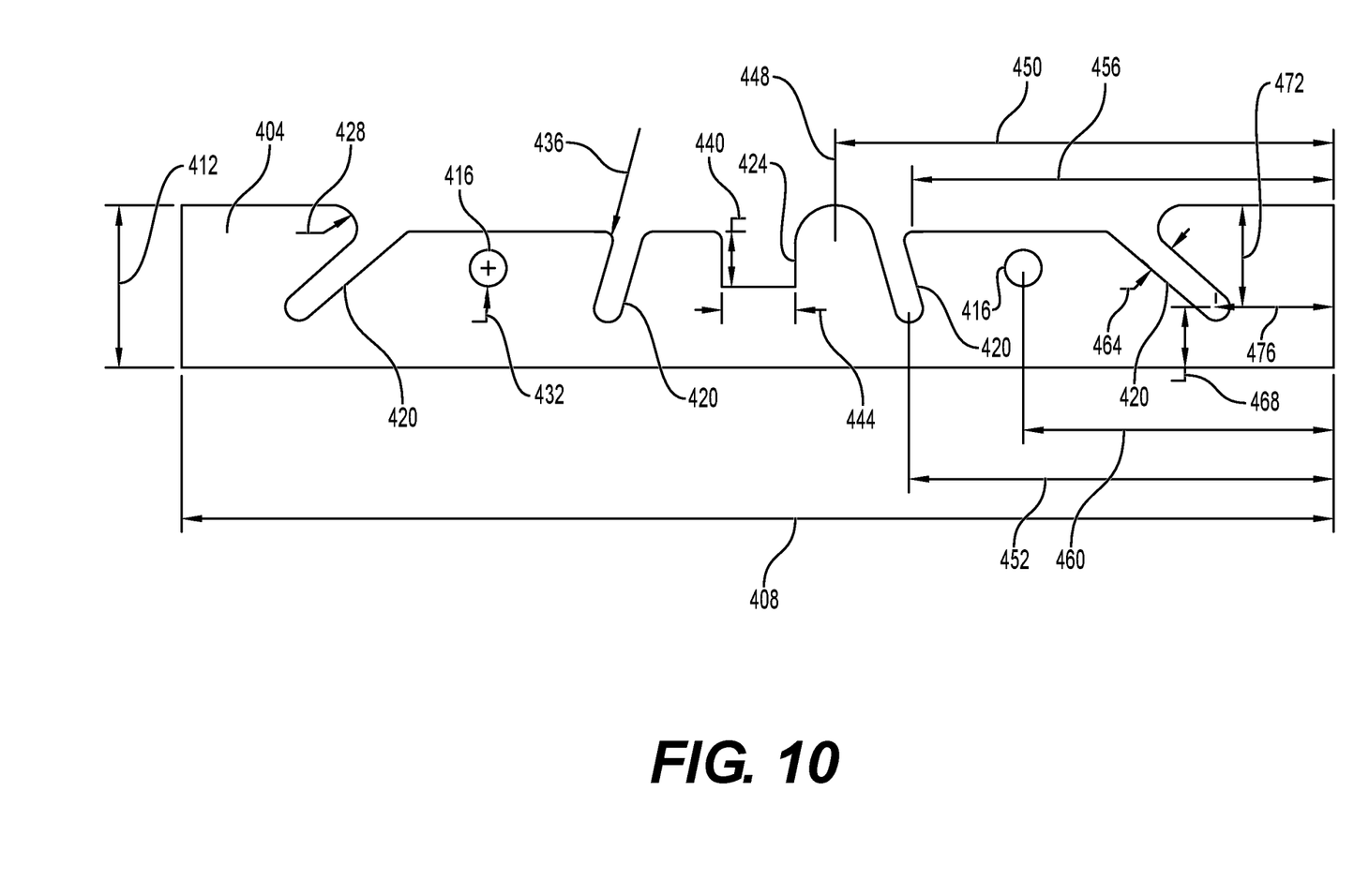
FIG. 10 is a schematic, top plan view of an illustrative embodiment of an insert for an embodiment of a tie-down chain anchor and storage system.

Referring now to FIG. 10, in some embodiments of the tie-down chain anchor and storage system 100 (FIG. 1) a reinforcement plate 404, or insert, may be welded to one side of the top, e.g., underneath the top surface 136. In an embodiment sized to work with the top portion of FIG. 8, the reinforcement plate 404 has a longitudinal dimension 408 of 15.72 inches and a lateral dimension 412 of 1.2 inches. The reinforcement plate 404 is cut to match the shape of the edge of the periphery of the top opening 140 that has the plurality of chain slots 146. In addition, it is formed with one or more apertures 416 for filling with a weld. Thus, the reinforcement plate 404 has a plurality of chain slots 420 and a strap slot 424.

The dimensions for this embodiment are as follows: dimension 428 is a 0.350 radius; dimension 432 of 0.5 inch diameter; dimension 436 of 0.125 radius, Typ 6 places; dimension 440 of 0.750 inches; dimension 444 of 1.0 inches; dimension 448 of 0.540 radius; dimension 450 of 6.802 inches; dimension 452 of 5.794 inches; dimension 456 of 5.749 inches; dimension 460 of 4.234 inches; dimension 464 of 0.380 inches; dimension 468 of 0.836 inches; dimension 472 of 1.4 inches; and dimension 476 of 1.6 inches.

Figure 11:
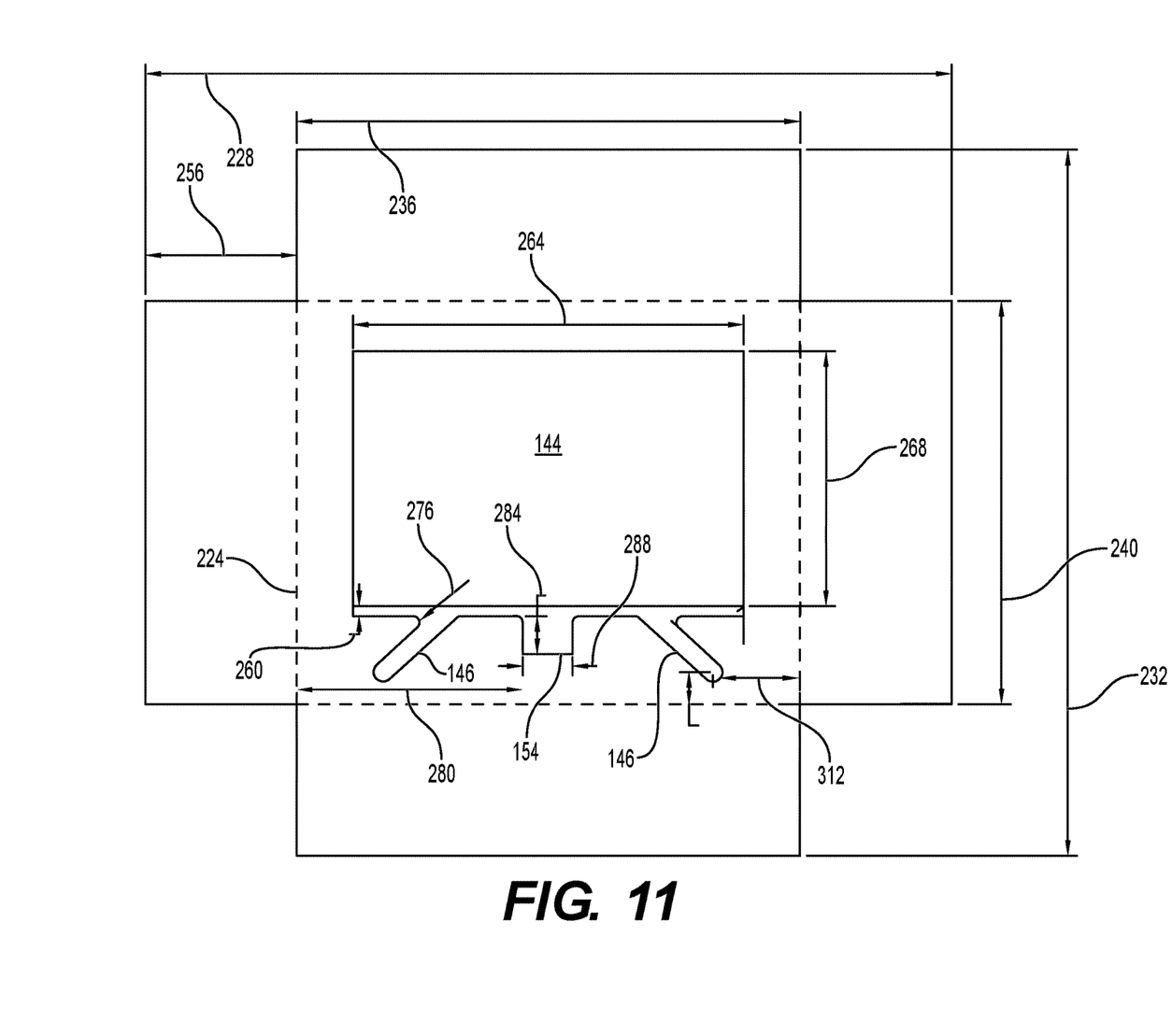
FIG. 11 is a schematic, top plan view of an illustrative embodiment of a tie-down chain anchor and storage system.

Referring now primarily to FIG. 11, a portion of another illustrative embodiment of a tie-down chain anchor and storage system 100 (FIG. 1) is presented. The figure shows an upper portion 164 and is analogous in most respects to that shown in FIG. 8 except there are fewer chain slots and the dimensions have been altered to make it a smaller unit. For example, it has a pre-bend longitudinal dimension 228 of 16 inches and a pre-bend lateral dimension 232 of 14 inches. Some of the other dimensions are as follows: dimension 256 of 3.0 inches; dimension 236 of 10.0 inches; dimension 264 of 7.75 inches; dimension 268 of 5.06 inches; dimension 276 of 0.125-inch radius Typ 6 places; dimension 284 of 0.75 inches; dimension 240 of 8.0 inches; dimension 260 of 0.2 inches; dimension 280 of 4.48 inches; dimension 288 of 1.0 inches; and dimension 312 of 1.736 inches.

Referring again to FIGS. 1 and 3, in some embodiments, the container 132 of the system 100 may be coupled to the trailer 104 inboard of a periphery of the trailer 104 as shown in FIG. 3. In some embodiments, the container 132 may be coupled to the trailer 104 outside the periphery of the trailer as shown in FIG. 1.

In one illustrative embodiment, the tie-down chain anchor and storage system is mounted at the front of a farm tractor. The stored chain may be applied and used to pull things as the tractor is reversed. In another embodiment, the container is used a storage system alone for a chain on a trailer or vehicle.

Although the present invention and its advantages have been disclosed in the context of certain illustrative, non-limiting embodiments, it should be understood that various changes, substitutions, permutations, and alterations can be made without departing from the scope of the invention as defined by the claims. It will be appreciated that any feature that is described in a connection to any one embodiment may also be applicable to any other embodiment.

What is claimed:

1. A tie-down chain anchor and storage system for use in combination with a flatbed trailer, the system comprising:
    a container having a flat top surface and interior compartment and a top opening;
    a lid coupled to the container proximate the top opening for selectively covering the top opening, wherein the lid is substantially flush with the flat top surface of the container;
    a first chain slot formed on an inboard location on a periphery of the top opening and proximate to the lid, wherein the first chain slot is sized and configured to secure a chain link when inserted and tension applied; and
    wherein the container is configured to be coupled to the flatbed trailer with the flat top surface of the closed container substantially flush with a top surface of the flatbed trailer.

2. The tie-down chain anchor and storage system for use in combination a flatbed trailer of claim 1, wherein the lid is coupled by hinges to the container by hinges.

3. The tie-down chain anchor and storage system for use in combination a flatbed trailer of claim 1, wherein the first chain slot is angled towards a rear of the flatbed trailer.

4. The tie-down chain anchor and storage system for use in combination a flatbed trailer of claim 1, wherein the container comprises a second chain slot that is substantially orthogonal to an edge of the top opening.

5. The tie-down chain anchor and storage system for use in combination a flatbed trailer of claim 1, wherein the container comprises a top portion and a bottom portion that are coupled.

6. The tie-down chain anchor and storage system for use in combination with a flatbed trailer of claim 1, wherein the container has an opening in a bottom floor for extending a portion of a chain therethrough for locking.

7. The tie-down chain anchor and storage system for use in combination with a flatbed trailer of claim 1, wherein the container comprises a top portion and a mating bottom portion and wherein the container has an opening in a bottom floor for extending a portion of a chain therethrough for locking.

8. The tie-down chain anchor and storage system for use in combination with a flatbed trailer of claim 1, wherein the container is rectangular in shape in plan view.

9. The tie-down chain anchor and storage system for use in combination with a flatbed trailer of claim 1, wherein the container is coupled to the flatbed trailer by welding.

10. The tie-down chain anchor and storage system for use in combination with a flatbed trailer of claim 1, wherein the container is coupled to the trailer inboard of a periphery of the trailer.

11. The tie-down chain anchor and storage system for use in combination with a flatbed trailer of claim 1, further comprising a reinforcement plate coupled to the compartment proximate to the top opening.

12. The tie-down chain anchor and storage system for use in combination with a flatbed trailer of claim 1, further comprising a strap aperture formed on a periphery of the top opening.

13. The tie-down chain anchor and storage system for use in combination with a flatbed trailer of claim 1, wherein the container has a longitudinal dimension between 8.0 and 25.0 inches and a lateral dimension between 8.0 and 20.0 inches.

14. The tie-down chain anchor and storage system for use in combination with a flatbed trailer of claim 1, wherein,
    the lid is coupled by hinges to the container;
    the first anchor slot is angled towards a rear of the trailer;
    the container comprises a top portion and a bottom portion that are coupled;
    the container has an opening in a bottom for extending a portion of a chain therethrough;
    the container is rectangular in shape in plan view;
    the container comprises a top portion and a mating bottom portion;
    the container is coupled to the flatbed trailer by welding; and
    further comprising a reinforcement plate coupled to the compartment proximate to the top opening.

15. A trailer for hauling equipment comprising:
    a flatbed portion for receiving the equipment;
    a plurality of tie-down anchor and storage systems coupled to the trailer;
    wherein the trailer has a periphery;
    wherein each member of the plurality of tie-down anchor and storage systems comprises:
        a container having a top surface with a top opening on a top member and a lid to selectively cover the top opening,
        a plurality of slots formed on the top member proximate the top opening, each of the plurality of slots for receiving a securing line, and
        wherein the container has an interior compartment for receiving and holding unused securing line; and
    wherein each of the plurality of tie-down anchor and storage systems has the top surface of the container flush with a top surface of the trailer.

16. The trailer of claim 15, wherein the plurality of tie-down anchor and storage systems are, when in an assembled position, inboard of the periphery of the trailer.

17. The trailer of claim 15, wherein the plurality of tie-down anchor and storage systems are, when in an assembled position, outboard of the periphery of the trailer.

18. The trailer of claim 15, wherein the plurality of tie-down anchor and storage systems each comprises a chain coupled to the container.

19. The trailer of claim 15, wherein for each of the plurality of tie-down anchor and storage systems the lid is coupled to the container by hinges.

20. The trailer of claim 15, wherein each of the plurality of tie-down anchor and storage systems comprises an upper portion that mates with a lower portion.

* * * * *